April 21, 1970 JEAN-CLAUDE GRANGER ET AL 3,508,063

PLURAL CELL PHOTOELECTRIC STRUCTURE

Filed May 13, 1968

2 Sheets-Sheet 1

Inventors:
Jean-Claude Granger
and
Jacques Raynaud
By Baldwin Wight Diller & Brown
Attorneys Inventors:
Jean-Claude Granger
and
Jacques Raynaud
BY Baldwin Wight Diller & Brown
Attorneys

United States Patent Office 3,508,063
Patented Apr. 21, 1970

3,508,063

PLURAL CELL PHOTOELECTRIC STRUCTURE

Jean-Claude Granger, Paris, and Jacques Raynaud, Brunoy, France, assignors to Societe Industrielle Bull-General Electric (Societe Anonyme), Paris, France Filed May 13, 1968, Ser. No. 728,437
Claims priority, application France, June 6, 1967, 109,206
Int. Cl. H01c *7/08*
U.S. Cl. 250—211 7 Claims

ABSTRACT OF THE DISCLOSURE

For the purpose of forming devices for reading marks or perforations on or in recording media or the like, each photoelectric element comprises a cell, for example a photovoltaic cell, of parallelepipedic form, a first metal lug soldered to a portion of the light-sensitive face and a second lug partly soldered to the opposite face of the cell. This structure lends itself to the simultaneous production of a number of elements, in which each set of lugs is cut out of a common metal strip, which remains at the time of the soldering of the lugs to the cells, which is effected in a single operation. The elements are thereafter separated either partially or completely.

Figure 2:
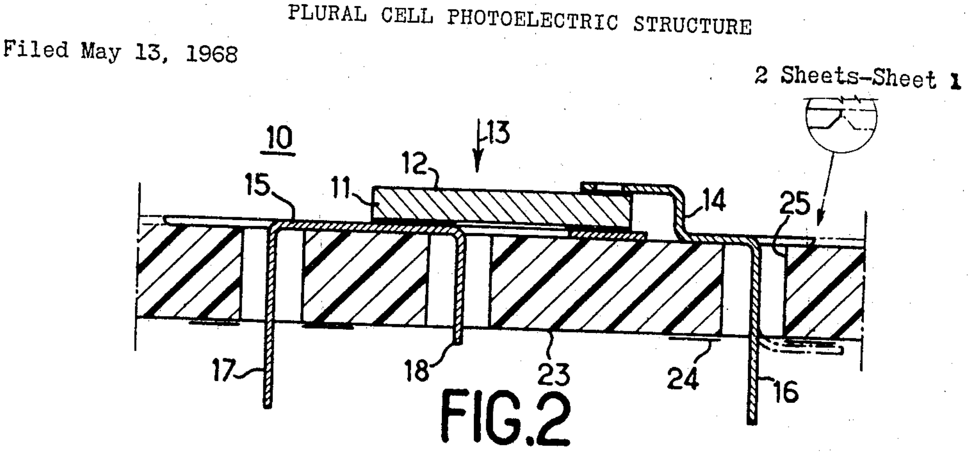

This invention is concerned with improvements in elements employed for the photoelectric reading of documents, for the photoelectric detection of the presence of objects moved along a conveying track, and the like purposes.

It is known that photoelectric cells have long been used in machines for processing recording media either for reading perforations or printed characters or for analysing coding devices and for many other applications.

For meeting requirements of miniaturisation, there are now available solid-state photoelectric cells of small dimensions, the use of which affords many advantages, but the application of which gives rise to a number of problems. Notably, the connection of such a cell to the conductors of the load circuits generally necessitates the performance of delicate soldering operations, which may result in considerable rejects. These disadvantages arise with photovoltaic cells, photo-resistive cells and photo-diodes in general.

The invention has for its object to provide a photoelectric cell element which may be readily and cheaply constructed and which can be connected by soldering with no or negligible rejects.

Another object of the invention is to provide a photoelectric cell which lends itself to standardised construction in which two types, distinguished by their dimensions, are sufficient to meet the requirements of the various applications considered in a wide range of machines. Another object of the invention is to lessen considerably the manufacturing tolerances of the photoelectric cell element, which is not only favourable to interchangeability but also permits of avoiding in some cases the adjustment necessary for determining a precise distance between the cell and the light source which is generally associated therewith.

These advantageous features arise out of the fact that a first soldering to common flat conductors is effected on a number of cells simultaneously and in a single operation, the individualisation of the elements being subsequently effected if necessary.

In accordance with the invention, there is provided a photoelectric cell comprising a cell of parallelepipedic form having one face to be exposed to light, called the upper face, and two connecting lugs of thin metal, one of such lugs having one end soldered to a portion of the upper face of the cell, and the other of such lugs having an end soldered to the lower face of the cell, each of said lugs comprising at least one tongue which is incompletely cut out and bent over in a direction opposite to or away from the cell.

In accordance with another aspect of the invention, there is provided a multiple sub-assembly comprising a number of photoelectric cell elements, as indicated in the foregoing, which are disposed side-by-side, wherein at least one of the aforesaid lugs is an integral part of a strip of like metal which can be used as a common conductor.

In accordance with another aspect of the invention, there is provided a sub-assembly comprising at least one photoelectric cell element, as previously described, which is disposed upon one face of an insulating plate, the other face of which carries printed circuits, and which is formed with holes for the passage of the aforesaid tongues, which are bent over and soldered to corresponding elements of the printed circuits.

Figures 1, 3:
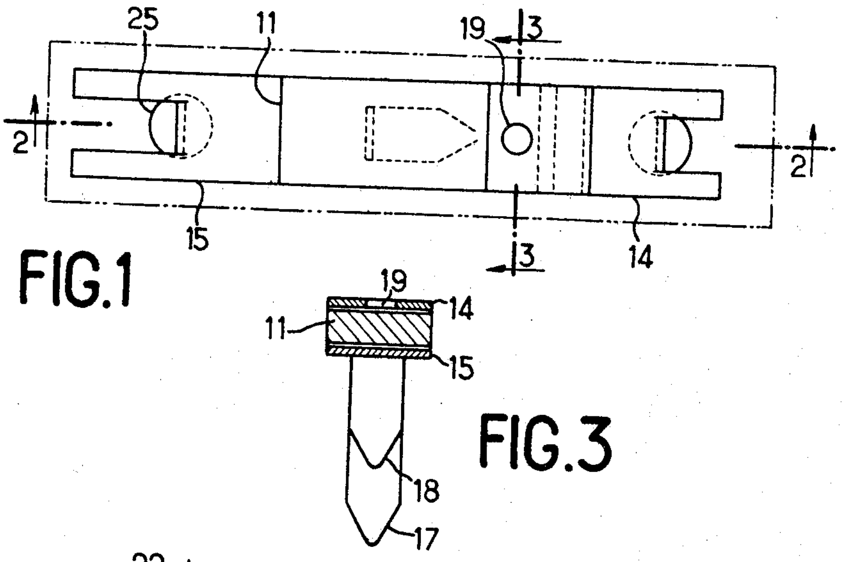

For a better understanding of the invention, and to show how it may be carried into effect, embodiments thereof will now be described, by way of example, with reference to the accompanying drawings, in which:

FIGURES 1, 2 and 3 are a plan view and two sectional views, respectively, of a photovoltaic cell element according to a first embodiment of the invention, FIGURE 2 being a sectional view taken along the line 2—2 of FIGURE 1 and FIGURE 3 being a sectional view taken along the line 3—3 of FIGURE 1.

Figure 4:
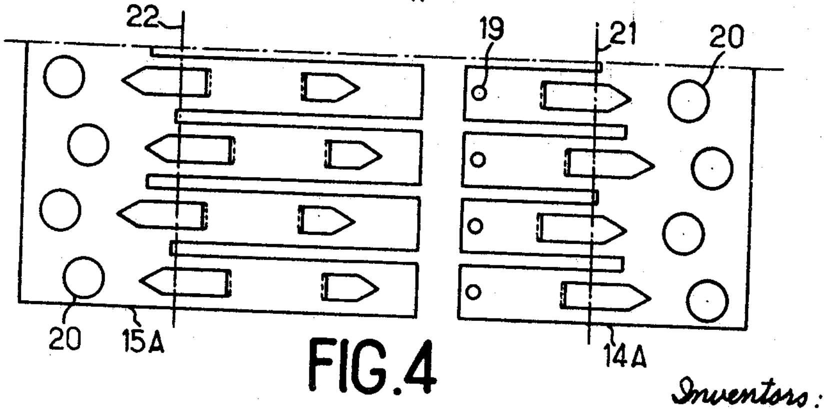
Figures 5, 6, 7:
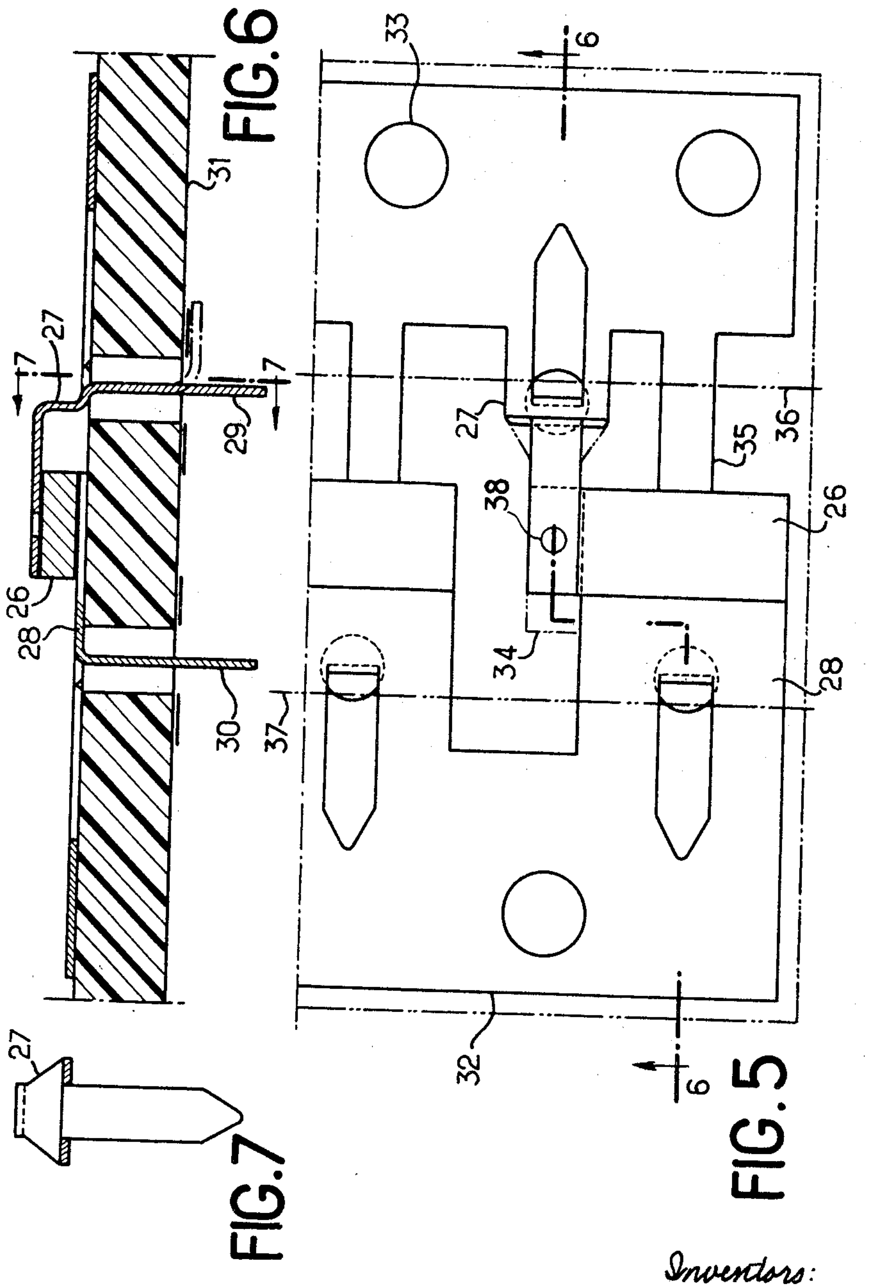

FIGURE 4 is a view of two cut-out metal strips suitable for the said first embodiment, and FIGURES 5, 6 and 7 are a plan view and two sectional views, respectively, of a photovoltaic cell element according to a second embodiment of the invention.

There may be seen in FIGURES 1, 2 and 3, a photovoltaic cell element 10 constructed essentially around a cell 11. The latter is in the form of a parallelepipedic solid of relatively small thickness. It consists of a silicon-based or if desired selenium-based pn-junction. The cell has a photo-sensitive face 12 intended to receive a light beam, the direction of which is indicated by the arrow 13, this photo-sensitive face being referred to herein as the upper face, in accordance with the drawing. This face of the cell constitutes the anode, while the cathode consists of the lower face. Good results can be obtained with a cell whose thickness is of the order of 0.3 to 0.6 mm., whose width is of the order of 2 mm. and whose length is about 5 mm. Cells of this type are supplied by the manufacturers with the lower face completley tinned, and with a small tinned portion on a part of the upper face.

The element comprises a first connecting lug 14, of which one end is twice bent over and extended over the tinned surface of the upper face of the cell 11. A second connecting lug 15 is disposed below the cell. These two lugs, which may consist of tinned brass of a thickness of 0.2 mm., take the form of strips of the same width as the cell 11. The lug 14 comprises a tongue 16 partially severed from the lug by punching and bent over downwards substantially at a right angle, on the side opposed to the photosensitive face of the cell. Likewise, the lug 15 comprises a tongue 17 partially severed from the lug by punching and bent over downwards in the same way as tongue 16. The lug 15 is also provided with another tongue 18 partially severed and bent over downwards like the tongues 16 and 17. An opening situated below the cell 11 and resulting from the partial severing of the tongue 18 serves to receive the surplus solder at the time of the soldering. In addition, if this surplus is considerable, the tongue 18 makes easier its flowing downwards. The upper end of each lug 14 is formed with a small hole 19 intended to receive any surplus solder. Of course, the vertical portion of the lug 14 is so positioned as to afford sufficient spacing with the cell 11. With reference to FIGURES 1 and 2, the bending lines of the tongues 16 and 17 are spaced from the adjacent edges of the cell 11.

FIGURE 4 illustrates a portion of a sheet metal blank which is cut to define strips 14A and 15A, from which the connecting lugs 14 and 15 respectively can be produced. It is proposed that the initial soldering of the cell to the connecting lugs be carried out on a number of connected elements, this number depending mainly upon the maximum length adopted for the soldering arrangement.

Positioning holes 20 may be arranged in a staggered relationship with respect to the lateral edges of strips 14A, 15A as illustrated, in the same way as the apertures corresponding to the bent-over tongues and to the windows provided to separate the strips of the neighbouring lugs.

The positioning holes 20, which are punched with the press punching tool which incompletely cuts out the lugs 14 and 15, can be used to locate the strips 14A and 15A on the soldering jig. The cutting-out of the strips 14A and 15A is designed to permit the construction of a reading device comprising a number of photovoltaic cell elements disposed side-by-side. In this first embodiment, the spacing of the elements may be 2.54 mm. Owing to the precautions taken, i.e. owing to the cutting-out of the tongues 18 and holes 19, burrs due to the surplus solder are avoided, which might cause short-circuiting between the neighbouring elements, which are in this case fairly close together.

The strips 14A and 15A are provided with fracture lines, which are represented by the lines 21 and 22 respectively. The individualised element illustrated in FIGURES 1 and 2 corresponds to the case where the outer portions of the strips 14A and 15A have been removed after the initial soldering. It may be seen from FIGURE 2 that these fracture lines are in the form of a triangular groove, preferably on the lower face of the said strips. In the case of a reading device comprising a number of elements, it is generally arranged to connect together the homologous electrodes of all the elements, for example the cathodes. There is then left the outer portion of the strip 15A, which serves as a common conductor. In order to separate the anodes electrically, it is sufficient to remove the outer portion of the strip 14A.

The initial welding operation is then extremely simple. After the strip 15A, the cells 11 and the strip 14A have been positioned on the soldering arrangement, it is relatively easy to hold all these parts fast. The whole arrangement is then brought to a temperature of 210° C. by any appropriate means, which results in soldering of the contacting tinned portions. The soldering of the ends of the lugs 14 and 15 to the cell is thus very reliably and rapidly effected in a single operation. It may be advantageous to apply additional solder, for example by previously inserting a small, very thin plate of tin solder between each cell and the corresponding lower lug. Mainly in the case of an individual element, the bent-over tongues 16 and 17 are used for connection by soldering to the wires of a load circuit. In the case of a device comprising a number of elements, it is proposed to mount these elements on a support, such as that illustrated in FIGURE 2. This support consists of an insulating plate 23, the lower face of which carries printed circuit elements such as 24. This plate consists of a glass-epoxy sheet or a sheet of any other appropriate material. It is formed with holes, such as 25, which permit the passage of the tongues 16, 17, 18, and thus effect the centering of the elements. When the ends of the tongues 16, 17 have been shortened, if necessary, they are bent over again as illustrated by dash-dotted lines in FIGURE 2, and then soldered in a single operation to the printed circuit elements surrounding the corresponding holes. Any tin soldering method may be employed, notably dip tinning, or the so-called "surge" method. In any case, this second soldering operation is not likely to damage the soldered joints of the cells with their connecting lugs.

FIGURES 5, 6 and 7 show in part a sub-assembly comprising a number of photovoltaic cell elements, the construction of which is similar to that previously described. FIGURE 6 is a sectional view taken along the line 6—6 of the plan view of FIGURE 5, while FIGURE 7 is a fragmentary view of a section taken along the line 7—7 of FIGURE 6. Since the spacing of the neighbouring elements in this second embodiment is greater than that in the first embodiment, for example of 6.35 mm., the cells are differently oriented.

In this case again, an element comprises a cell 26, an upper lug 27 and a lower lug 28. The lugs 27 and 28 are provided with a bent-over tongue 29 and 30 respectively. It will be seen in FIGURES 5 and 7 that the lug 27 above the tinned zone of the upper face of the cell 26 is of the same width as this zone, but the lug is wider in its part in contact with the support 31 in order that the tongue 29 may be partially severed therefrom by punching. The narrow portion of the upper lug 27 is formed with a small hole 38 to permit the passage of surplus solder, if any.

FIGURE 5 shows that the lugs 27 and 28 may be obtained from a single cut-out strip 32, which is formed with positioning holes such as 33. Before the narrow portion of the lug 27 is given the final double bend, its end extends as shown at 34. On the other hand, there is provided level with each element a strip 35 which establishes the connection between the right-hand and left-hand portions of the strip 32.

Therefore, the strip 32 is cut out by means of a combined tool to form the contours of the lugs and of the tongues, the latter also being bent over. Thereafter, the upper lug and the lower lug are separated in each element by local shearing. Two rectilinear fracture lines are made in the lower face of the strip 32, the positions of these fracture lines being indicated by the lines 36 and 37. Finally, the double bending of the upper lugs 27 is effected by means of an appropriate tool.

The assembling and soldering operations are similar to those previously described. In the case of a device comprising a number of elements whose anodes must be individually accessible, that portion of the strip 32 which is situated to the right of the line 36 will be removed by bending. This separation may be effected either before or after the soldering of the tongues 29, 30 to the printed circuit elements.

It will be readily appreciated from FIGURES 2 and 6 that the variations in the total thickness of a photovoltaic cell element may be very small, since they depend mainly upon tolerances in the thicknesses of the cell and of the support plate.

It is to be noted that, if it is necessary to replace one or more defective elements in a multiple device, the construction according to the invention readily lends itself to this replacement without any danger of damage to the neighbouring photovoltaic cells or to their soldered joints.

There is nothing to prevent the use of the photovoltaic cells whose upper and lower faces correspond to the cathode and to the anode respectively. For the formation of the cut-out lugs, there may be employed solderable metals other than brass, interalia an iron-nickel-cobalt alloy such as that known under the trademark "Kovar." In the latter case, the assembly or soldering of the parts may be effected by thermocompression.

Although the essential features of the invention have been described in the foregoing and illustrated in the drawings, it is obvious that the person skilled in the art may make therein any modifications of form or detail which are considered desirable without departing from the scope of the invention.

We claim:

1. A photoelectric cell element having two connecting terminals, which comprises: a photoelectric cell of parallelepipedic form having a first face adapted to receive light rays and a second face opposite to the first face, said first face comprising a small tinned zone towards one end and the second face being tinned; a first metal lug comprising a double bend and having one end soldered to the said zone of the cell, and a second metal lug having a portion soldered to the said second face of the cell, each of said lugs being extended outside the cell and each comprising a tongue which is partially severed from the associated lug and is bent over along a line spaced from the adjacent edge of said cell to extend substantially perpendicularly to and away from said cell on the side of said cell having said second face.

2. A photoelectric cell element according to claim 1, wherein that portion of said second lug which is soldered to the cell comprises another tongue which is partially severed from said second lug and is bent over to extend substantially perpendicularly to and away from said cell on the side of said cell having said second face.

3. A photoelectric cell sub-assembly composed of a plurality of spaced apart photoelectric cell elements, each element comprising: a photoelectric cell of elongate parallelepipedic form with a first face adapted to receive light rays and a second face opposite to the first face, said first face comprising a small tinned zone towards one end and the second face being tinned, a first metal lug having one end soldered to the said zone of the cell and a second metal lug soldered to the said second face of the cell, each of said lugs comprising a tongue partially severed from the associated lug and bent over along a line spaced from the adjacent edge of said cell to extend substantially perpendicularly to and away from said cell on the side of said cell having said second face, this sub-assembly comprising in addition a metal strip from which at least one of said first and second lugs is formed as an extension by partial cutting out, said strip serving as a common conductor for the homologous terminals of said cells.

4. A sub-assembly according to claim 3, wherein the said cells are spaced and disposed in parallel relationship so that their lengths are perpendicular to the direction of the said strip.

5. A sub-assembly according to claim 4, comprising in addition a thin plate of insulating material carrying printed circuit elements on one face, while its other face serves as a support for the said lugs, the said plate being formed with holes for the passage of the said tongues, some of the latter being bent over again and soldered to corresponding elements of the said printed circuits.

6. A sub-assembly according to claim 3, wherein the said cells are spaced and aligned on a common axis parallel to the said strip.

7. A sub-assembly according to claim 6, comprising in addition a thin plate of insulating material carrying printed circuit elements on one face, while its other face serves as a support for the said lugs, the said plate being formed with holes for the passage of the said tongues, some of the latter being bent over again and soldered to corresponding elements of the said printed circuits.

References Cited

UNITED STATES PATENTS

| | | | |
|---|---|---|---|
| 3,028,500 | 4/1962 | Wallmark | 250—211 |
| 3,082,327 | 3/1963 | Rice | 250—211 |

RALPH G. NILSON, Primary Examiner

M. ABRAMSON, Assistant Examiner

U.S. Cl. X.R.

250—212